(12) United States Patent
Engdahl

(10) Patent No.: US 8,184,675 B2
(45) Date of Patent: May 22, 2012

(54) RESIDUAL FREQUENCY OFFSET EXPLOITATION

(75) Inventor: Karin Engdahl, Staffanstorp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1636 days.

(21) Appl. No.: 11/457,029

(22) Filed: Jul. 12, 2006

(65) Prior Publication Data

US 2008/0013650 A1   Jan. 17, 2008

(51) Int. Cl.
*H04B 1/707* (2006.01)
*H04L 27/06* (2006.01)

(52) U.S. Cl. .................................. 375/147; 375/344

(58) Field of Classification Search .......... 375/142, 375/144, 147, 148, 150, 260, 343; 370/335, 370/342; 455/192.1, 192.2
See application file for complete search history.

(56) References Cited

U.S. PATENT DOCUMENTS

| | | | |
|---|---|---|---|
| 5,361,276 A * | 11/1994 | Subramanian | 375/150 |
| 5,878,093 A | 3/1999 | Molnar et al. | |
| 6,278,725 B1 | 8/2001 | Rouphael et al. | |
| 6,522,696 B1 | 2/2003 | Mobin et al. | |
| 6,608,858 B1 | 8/2003 | Sih et al. | |
| 6,741,665 B2 | 5/2004 | Kenney et al. | |
| 6,760,573 B2 | 7/2004 | Subrahmanya et al. | |
| 6,922,434 B2 | 7/2005 | Wang et al. | |
| 6,956,915 B2 | 10/2005 | Sanchez et al. | |
| 6,980,775 B2 | 12/2005 | Alazraki et al. | |
| 7,725,090 B2 * | 5/2010 | Cheng et al. | 455/192.2 |
| 2003/0054768 A1 | 3/2003 | Challa et al. | |
| 2004/0013169 A1 | 1/2004 | Kanemoto et al. | |
| 2004/0058658 A1 | 3/2004 | Kirsch et al. | |
| 2004/0071239 A1 * | 4/2004 | Kim et al. | 375/346 |
| 2004/0086070 A1 * | 5/2004 | Sachse et al. | 375/375 |
| 2005/0105647 A1 | 5/2005 | Wilhelmsson et al. | |
| 2005/0141658 A1 | 6/2005 | Tanaka et al. | |
| 2006/0171449 A1 * | 8/2006 | Lindoff et al. | 375/148 |

FOREIGN PATENT DOCUMENTS

| | | |
|---|---|---|
| EP | 1 300 962 A1 | 4/2003 |
| EP | 1 398 889 A1 | 3/2004 |
| EP | 1 416 692 A2 | 5/2004 |
| EP | 1 530 334 A2 | 11/2004 |
| WO | 00/21201 A2 | 4/2000 |
| WO | 00/38343 A1 | 6/2000 |
| WO | 01/59937 A2 | 8/2001 |
| WO | 02/29978 A2 | 4/2002 |
| WO | 2004/077713 A1 | 9/2004 |
| WO | 2005/099205 A1 | 10/2005 |

OTHER PUBLICATIONS

Li, Gang et al.: "A speed estimation based two-stage symbol aided channel estimator for frequency non-selective variant fading channel" IEEE International Conference on Personal Wireless Communications, Dec. 17, 2000, pp. 109-113, XP010534023, Piscataway, US.

(Continued)

*Primary Examiner* — Young T. Tse
(74) *Attorney, Agent, or Firm* — Potomac Patent Group PLLC

(57) ABSTRACT

Respective residual frequency offsets of de-spread correlated signals derived from a received communication signal are determined and used to improve receiver performance in high-velocity situations. The knowledge of the residual frequency offsets of the respective fingers can be used for adaptive AFC combining, improved velocity estimation, and adaptive residual frequency offset compensation.

20 Claims, 4 Drawing Sheets

OTHER PUBLICATIONS

Proakis, John: "Digital Communications", 4th ed. 2001, Section 14.5, Digital Signaling over a Frequency-Selective, Slowly Fading Channel, McGraw-Hill.

European Standard Search Report, completed Jan. 31, 2007, in connection with U.S. Appl. No. 11/457,029.

* cited by examiner

RESIDUAL FREQUENCY OFFSET EXPLOITATION

BACKGROUND

This invention relates to mobile wireless communication systems.

In a typical wireless communication system, each device, e.g., a user equipment (UE), a base station (BS), etc., has a local oscillator (LO) that defines a local time reference. It is important for the LOs of devices communicating with each other to be aligned as precisely as possible. If two devices' LOs are not aligned, their time references drift in relation to each other, which can result in the devices' being no longer capable of receiving information properly from each other and in loss of the connection.

LO alignment is particularly important to wireless communication systems like wideband code division multiple access (WCDMA) mobile telephone systems and other digital mobile telephone systems. In such systems, a typical receiver uses automatic frequency control (AFC) to adjust its LO so that it aligns well with the LO(s) of the transmitter(s) to which it is connected.

A WCDMA communication system uses direct-sequence spread-spectrum techniques. Pseudo-noise scrambling codes and orthogonal channelization codes separate BSs and physical communication channels, respectively, in the downlink (BS-to-UE) and uplink (UE-to-BS) directions. Scrambling and channelization codes are well known in the art, and WCDMA and other third-generation (3G) and future communication systems operate in accordance with standards promulgated by the Third Generation Partnership Project (3GPP).

High-speed downlink (DL) packet access (HSDPA) is an evolution of WCDMA communication systems that provides higher bit rates by using higher order modulation, multiple spreading codes, adaptive forward error correction (FEC), and DL-channel feedback information. The DL-channel feedback information is information sent by a UE to a BS through the uplink (UL) channel regarding the DL channel's quality. The cell providing HSDPA service is usually called the "serving" cell, and the serving cell uses the DL-channel feedback information to optimize the DL modulation and coding for throughput.

Of course, AFC operation is almost never perfect, which is to say that there is almost always a non-zero frequency difference between the LOs of the transmitting and receiving devices even with AFC. The operation of a typical AFC involves studying communication-channel parameters over time and attempting to adjust an LO based on at least those parameters. For example, complex-valued estimates of the impulse response of the communication channel might be studied over time, and the adjustment of the LO may be done such that no rotation of the channel estimates is seen in the complex (or I-Q) plane. That kind of adjustment is based on the fact that rotation in the I-Q plane corresponds to relative frequency drift of the LOs, which in turn corresponds to relative time reference drift.

FIG. 1 is a block diagram of an apparatus 100, which may be a portion of a receiver in a typical UE or BS, and depicts the operation of a typical AFC. A voltage-controlled crystal oscillator (VCXO) 102 generates the LO signal used by a receiver front end (RX Fe) 104. The frequency of the LO signal produced by the VCXO 102 is responsive to a control signal $f_{err}$ generated by an AFC 106, and as illustrated, the control signal produced by the AFC 106 may be converted to an analog control voltage by a digital-to-analog converter (DAC) 107.

The LO frequency set by the AFC 106 is called the "AFC frequency" in this application. In the arrangement depicted in FIG. 1, the AFC 106 generates the control signal $f_{err}$ based on channel estimates $\hat{h}_f$ produced by a channel estimator 108, which typically provides such estimates to other devices in the receiver, including for example a RAKE combiner 110 and a signal-to-interference ratio (SIR) estimator 112. The channel estimator 108 generates the channel estimates from correlated signals provided by a de-spreader 114, which generates the correlated signals from signals from the RX Fe 104. Correlated signals from the de-spreader 114 are selectively combined based on the channel estimates by the RAKE combiner 110.

De-spreading, channel estimation, and RAKE combining are well known in the art. Channel estimation generally involves multiplying the correlated signals with the complex conjugates of known signals (or pilots), and possibly averaging the results over time. U.S. Patent Application Publication No. 2005/0105647 by Wilhelmsson et al. for "Channel Estimation by Adaptive Interpolation" describes channel estimation in a communication system using orthogonal frequency division multiplex. RAKE combining is described in, for example, John G. Proakis, "Digital Communications", 3rd ed., pp. 797-806, McGraw-Hill; and U.S. Pat. No. 6,922,434 by Wang et al. for "Apparatus and Methods for Finger Delay Selection in Rake Receivers". Signals from the RAKE combiner 110 and SIR estimator 112 are typically used in further processing operations carried out by the UE or other receiver.

A typical AFC 106 periodically reports a single frequency error $f_{err}$ that is a weighted combination of frequency errors of respective de-spread fingers, although it will be understood that this is just one of many possible examples. One or more channel estimates $\hat{h}_f$ are collected for each finger f during a given time period, e.g., during each of the successive time slots into which the received signal is organized. The current channel estimate(s) $\hat{h}_f$ and channel estimates collected in the previous period $\hat{h}_f^{previous}$ determine a value y, which is given by:

$$y = \sum_f \hat{h}_f (\hat{h}_f^{previous})^*.$$

where the asterisk denotes complex conjugation. The value y may be filtered, for example according to:

$$y_{filt} = \lambda(y - y_{filt}^{previous}) + y_{filt}^{previous}$$

where $y_{filt}$ is the current filtered value, $\lambda$ is a filter parameter, and $y_{filt}^{previous}$ is the filtered value for the previous period or previous channel estimate. It will be understood that the filter state is appropriately initialized or reset from time to time. The frequency error $f_{err}$ is then given by:

$$f_{err} = \phi/2\pi\Delta t$$

where the phase angle $\phi = \arg(y_{filt})$ and $\Delta t$ is the time interval between two consecutive updates of the AFC (e.g., two consecutive collected channel estimates). For just two of many possible examples, $\Delta t$ may be $1/1500$s or $1/7500$s. These computations are conveniently called "typical AFC computations" in this application.

Besides the weighted combination that results from the summation over de-spread fingers, other combinations of the fingers' frequency errors are possible. For example, an unweighted combination or the median value can be used. U.S. patent application Ser. No. 09/678,907 by Dent et al., which corresponds to International Patent Publication No.

WO 02/29978 A2 and which is now U.S. Pat. No. 7,443,826, describes use of simply the frequency error of the strongest de-spread finger. When applicable, the reported frequency error may also be equal to that of an HSDPA serving cell. The differences between the AFC frequency and the frequencies of the respective de-spread fingers are called "residual frequency offsets" in this application.

In low-relative-velocity situations, the frequency differences between the fingers, and thus the residual frequency offsets, due to Doppler shifts are usually not large, but in high-relative-velocity situations, the frequency differences and residual frequency offsets can be large enough to degrade receiver performance. For example, channel estimation, power estimation, interference estimation, SIR estimation, relative channel gain estimation (e.g., the difference between the common pilot channel (CPICH) and dedicated physical channel (DPCH) in a WCDMA communication system), and combining can be affected by large residual frequency offsets.

U.S. patent application Ser. No. 09/678,907 describes compensating for residual frequency offsets in a receiver chain. The compensation can include estimation of a residual frequency offset for each finger $f_{err,f}^{res}$, and frequency error correction (de-rotation) of received, de-spread symbols for each finger for for each cell (transmitter). Such compensation can enhance receiver performance in high-velocity situations or when the LOs are not well aligned in frequency, but for a receiver to apply the compensation, a channel estimator having increased complexity is needed. The compensation itself can also introduce additional operations that must be carried out. The additional complexity of this compensation strategy is costly and thus can be undesirable.

As depicted in FIG. 1, a receiver can include a Doppler-spread estimator 116 that is sometimes also used as a velocity estimator. A typical Doppler estimator applies either an argument- (or zero-) crossing algorithm or a level-crossing algorithm, for example, to received signals. A variant of the argument-crossing algorithm counts the number of times that the complex channel estimate crosses either of the I and Q axes. The level-crossing algorithm counts the number of times the absolute value of the complex channel estimate crosses a given level. Estimates of the Doppler spread can be used to set operation mode and parameter values for various blocks in the receiver chain, e.g., the AFC 106, the RAKE combiner 110 (which may alternatively be a generalized RAKE or other type of RAKE receiver or signal equalizer), the SIR estimator 112, as well as an estimator of the relative channel gain (part of the further processing indicated generally in FIG. 1).

A conventional Doppler estimator is a poor velocity estimator because the conventional Doppler estimator bases its estimates on the Rayleigh fading properties of the strongest signal paths, or de-spread fingers. Thus, the conventional Doppler estimator is inappropriate for situations having weak or no fading, e.g., line-of-sight (LOS) communication conditions where the strongest path is typically dominant and has a Ricean distribution. In the context of a UE in a 3G mobile telephone system, those situations include passing close by a BS. It is thus desirable to be able to generate velocity estimates that avoid the problems of conventional Doppler estimators.

SUMMARY

In one aspect of this invention, there is provided a method of controlling a receiver based on a signal received through a communication channel. The method includes the steps of collecting a plurality of estimates of a channel parameter; determining a plurality of residual frequency offsets from the plurality of estimates of the channel parameter; and determining an operating mode of the receiver based on at least one of the plurality of residual frequency offsets.

In another aspect of this invention, there is provided an apparatus for controlling a receiver based on a signal received through a communication channel. The apparatus includes a de-spreader configured to generate correlated signals from a signal received through the communication channel; a channel parameter estimator configured to generate a plurality of estimates of a parameter of the communication channel from correlated signals; a residual frequency offset computer configured to determine a set of residual frequency offsets based on the plurality of channel estimates; and a controller configured to determine an operating mode of the receiver based on at least one of the plurality of residual frequency offsets.

BRIEF DESCRIPTION OF THE DRAWINGS

The several features, objects, and advantages of this invention will be understood by reading this description in conjunction with the drawings, in which.

DETAILED DESCRIPTION

Figure 1:
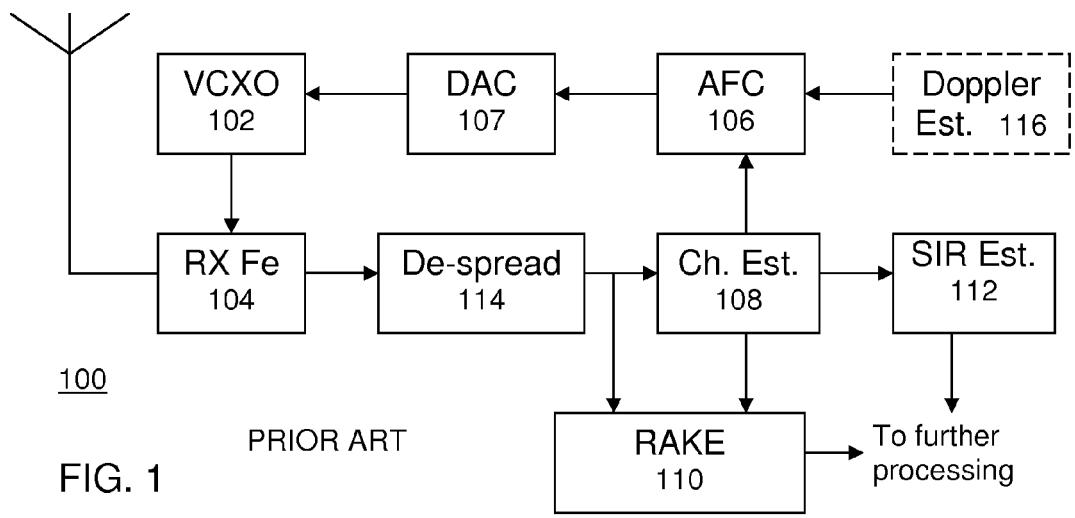
FIG. 1 is a block diagram of a portion of a typical receiver.

In accordance with aspects of the invention as described in more detail below, the respective residual frequency offsets of the de-spread fingers are determined and used to improve receiver performance, particularly in high-velocity situations. To be more precise, let $f_{err,f}^{res}$ denote the respective residual frequency offset of a finger f, where f∈F and F is, for example, the set of fingers involved in AFC operation. Then, a function of $f_{err,f}^{res}$ is used as a control signal or switch to select or turn on/off various algorithms implemented in the receiver, or in other words to determine an operating mode of the receiver. One suitable example of the function, which may be called ζ, is the following:

$$\zeta(f_{err,f}^{res}) = \max_{f \in F}(f_{err,f}^{res})$$

which is a short-hand way to say that one uses the maximum residual frequency offset of a set of residual frequency offsets as the control signal or switch that determines the operating mode. Another suitable example of the ζ is the following:

$$\zeta(f_{err,f}^{res}) = \frac{1}{F}\sum_{f \in F} f_{err,f}^{res}$$

which is a short-hand way to say that one uses the average of a set of residual frequency offsets as the control signal or switch.

Using the residual frequency offsets, the performance of various receiver algorithms, such as, for example, interference and SIR estimation, can be improved by an adaptive AFC that is described in more detail below. In addition, problems with using a Doppler estimate as a velocity estimate are overcome by a complementary velocity estimate based on the residual frequency offsets. Another way to reduce the additional complexity of the prior compensation strategy is to use the prior compensation strategy only when it is needed based on the residual frequency offsets as described in more detail below.

The residual frequency offset per finger $f_{err,f}^{res}$ can advantageously be determined by computations that are similar to the typical AFC computations described above. For example, compute a value $y_f$, which is given by:

$$y_f = \hat{h}_f (\hat{h}_f^{previous})^*$$

and, if desired, generate a filtered value $y_{f,filt}$ according to:

$$y_{f,filt} = \lambda(y_f - y_{f,filt}^{previous}) + y_{f,filt}^{previous}$$

where $y_{f,filt}$ is the current filtered value, $\lambda$ is a filter parameter that in general may be different from the filter parameter in the typical AFC operations, and $y_{f,filt}^{previous}$ is the filtered value for the previous period. The residual frequency offset per finger $f_{err,f}^{res}$ is then given by:

$$f_{err,f}^{res} = \phi_f / 2\pi \Delta t$$

where the phase angle $\phi_f = \arg(y_{f,filt})$ and $\Delta t$ is the time interval between $\hat{h}_f$ and $\hat{h}_f^{previous}$. It will be appreciated that other options include averaging $y_f$ over the fingers from the same communication link or over the fingers from the same transmitter (e.g., cell or BS). These computations are called "AFC-like computations" in this application.

The knowledge of the residual frequency offsets of the respective fingers can be used in several ways, three of which may be called adaptive AFC combining, improved velocity estimation, and adaptive residual frequency offset compensation. Each of these is described in more detail below.

Adaptive AFC Combining

The inventor has appreciated that when there are large differences between the frequency errors of the respective fingers and the average frequency error, which is conventionally used to determine the AFC frequency, it can be beneficial to let the AFC report the frequency error of one of the fingers instead of the average value. This is so because if the average value is reported, there is a risk that none of the fingers has a small residual frequency offset. Whether this has an impact on the AFC or not, the frequency errors affect other operations in the receiver; for example, SIR estimates for all of the fingers will be erroneous. Thus, if the AFC reports the frequency error of one of the fingers rather than the average, then at least the SIR estimate of that finger will probably be accurate, and the other fingers may be given much lower significance or may even be discarded in worst-case situations.

Therefore, it is advantageous for a receiver to use an adaptive AFC combining algorithm, in which the AFC reports the frequency error of one of the fingers, preferably the strongest finger, if $$\zeta(f_{err,f}^{res}) = \max_{f \in F}(f_{err,f}^{res})$$

is larger than a selected threshold. Alternatively, the AFC can report the frequency error of one of the fingers if $$\zeta(f_{err,f}^{res}) = \frac{1}{F} \sum_{f \in F} f_{err,f}^{res}$$

is larger than a selected threshold. Otherwise, the AFC reports the frequency error $f_{err}$ determined according to its conventional setting, e.g., a weighted average of the respective frequency errors of the set of de-spread fingers as described above in connection with the typical AFC computations.

Figure 2:
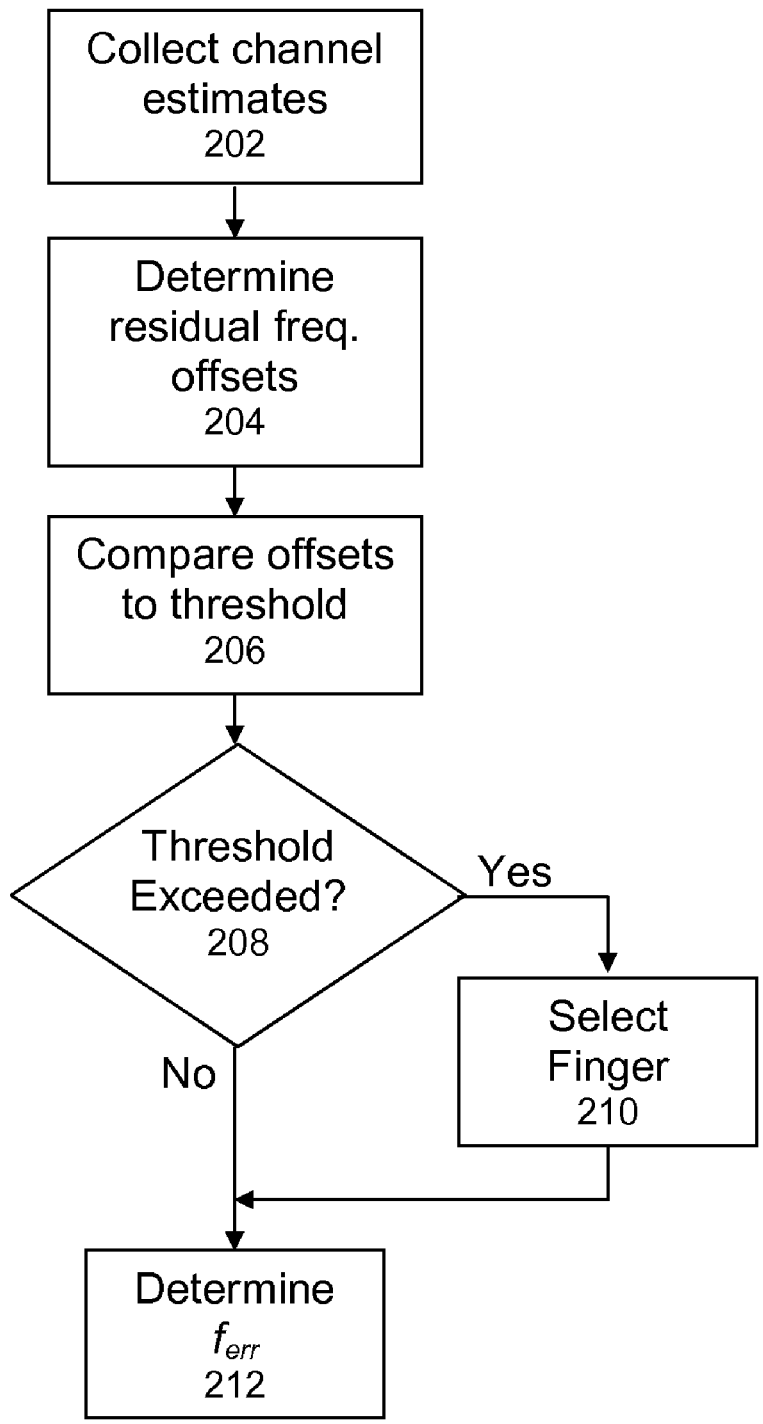
FIG. 2 is a flow chart of a method of adaptive AFC combining and/or improved velocity estimation.

FIG. 2 is a flow chart of a method of adaptive AFC combining as described above. The method begins in general with a step of collecting a plurality of uncompensated channel parameters, e.g., channel estimates, each of which is based on a respective de-spread correlated signal (step 202). The uncompensated channel estimates are used in the above-described AFC-like computations to determine respective residual frequency offsets for the correlated signals (step 204). The residual frequency offsets or a function $\zeta(f_{err,f}^{res})$ of the offsets are then compared to a threshold (step 206). If the threshold is exceeded (Yes in step 208), a sub-set of the fingers, e.g., one of the fingers or the fingers corresponding to one cell, is selected (step 210) and only the uncompensated channel estimates for the selected finger(s) are used in the above-described typical AFC computations to determine the control signal $f_{err}$ (step 212). As noted elsewhere in this application, the selected finger, or cell, may be the strongest one received or the HSDPA serving cell. If the threshold is not exceeded (No in step 208), another setting is used. For example, an average of the uncompensated channel estimates of several or all of the fingers/cells are used in the typical AFC computations to determine the control signal $f_{err}$ (step 212). Suitable threshold values can be readily determined based on experiment and design preference and depend on, for example, the function $\zeta(f_{err,f}^{res})$ used.

Figure 3:
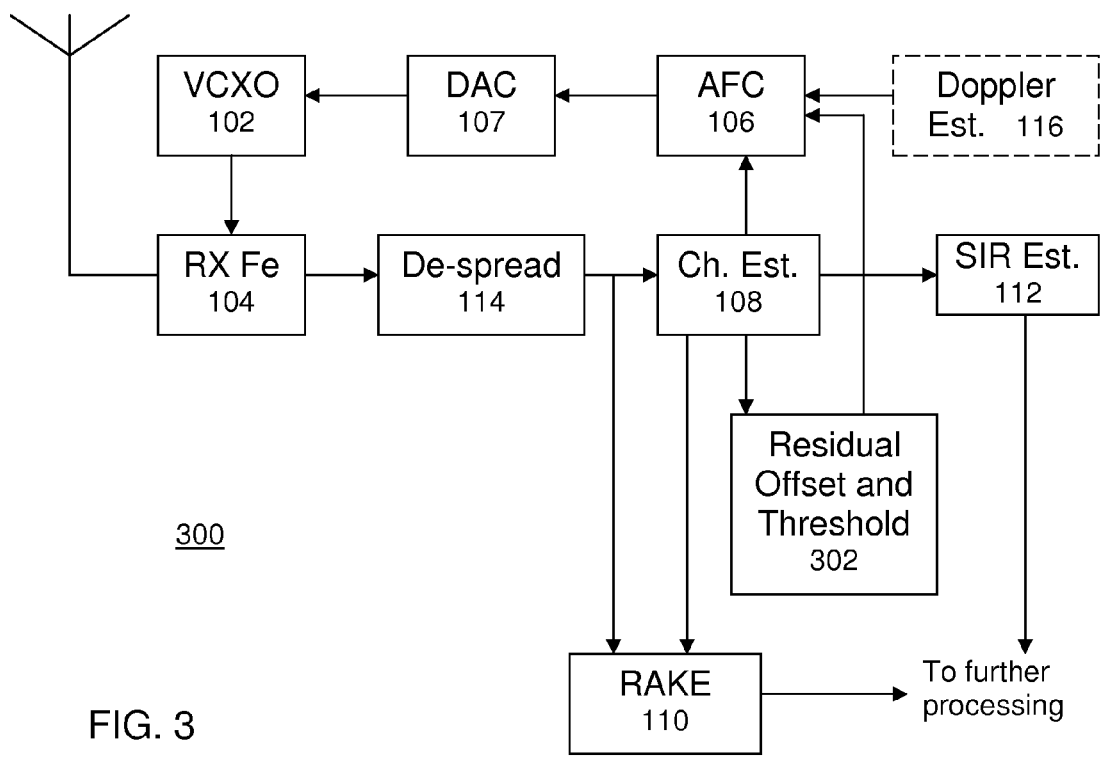
FIG. 3 is a block diagram of a portion of a receiver that implements adaptive AFC combining and/or improved velocity estimation.

FIG. 3 is a block diagram of an apparatus 300, which may be a portion of a receiver in a typical UE or BS, that can carry out adaptive AFC combining as described above. Those components of the apparatus 300 that are the same or substantially the same as the components of the apparatus 100 have the same reference numerals. As in the apparatus 100, the apparatus 300 includes a controllable oscillator 102 that generates the LO signal used by an RX Fe 104. The frequency of the LO signal produced by the oscillator 102 is responsive to a control signal $f_{err}$ generated by an AFC 106, and as illustrated, the control signal produced by the AFC 106 may be converted to an analog control signal by a DAC 107. The AFC 106 generates the control signal $f_{err}$ according to the typical AFC computations, but in the apparatus 300, the control signal $f_{err}$ is based on selected uncompensated channel estimates $\hat{h}_f$ from a channel estimator 108, which computes the estimates based on de-spread correlated signals from the de-spreader 114.

As indicated by FIG. 3, the channel estimator 108 provides the uncompensated channel estimates to a residual frequency offset and threshold device 302, which computes the residual frequency offset per finger $f_{err,f}^{res}$ according to the AFC-like computations described above. If the value of a function of the residual frequency offsets exceeds a suitable threshold, the device 302 causes the AFC 106, for example in response to a control signal, to generate the control signal $f_{err}$ based on uncompensated channel estimates of, for example, only one finger. It is currently believed that, in some situations, it may be useful to use the finger that is not necessarily the largest, e.g., the HSDPA serving cell when applicable. It will be understood that the device 302 is shown in FIG. 3 as a separate block, but this is not necessary. The computations performed by the device 302 can be performed by any other suitable processor or logic device in the receiver, such as the AFC 106.

Adaptive AFC combining provides an alternative way to cope with the negative effects of large residual frequency offsets. In use, the AFC may report the frequency error of one finger instead of an average value, which ensures that at least that finger is usable for SIR estimation, CPICH-DPCH gain estimation, combining, etc. It is currently believed that adaptive AFC combining is probably not needed when compensation of residual frequency offset is employed as described in more detail below.

Improved Velocity Estimation

The inventor has also understood that $\zeta(f_{err,f}^{res})$ can be seen as a form of velocity estimate because large residual frequency offset values occur only in high-velocity situations (or if the AFC and/or LO is not working properly, or if the LOs are not well aligned in frequency). Even so, it should be understood that a high value of $\zeta(f_{err,f}^{res})$ may not be seen in all high-velocity situations, e.g., a single-cell, LOS situation.

Thus, $\zeta(f_{err,f}^{res})$ can advantageously be used as a supplementary velocity estimate, which can be combined in a logical-OR fashion with, for example, a conventional Doppler estimate or other velocity estimate, and possibly with methods described in U.S. patent application Ser. No. 11/456,998, filed on Jul. 12, 2006, by K. Engdahl et al., for "Detection of High Velocity Movement in a Telecommunication System", which is now U.S. Patent Application Publication No. US 2008/0014881; and U.S. patent application Ser. No. 11/457,018, filed on Jul. 12, 2006, by K. Engdahl, for "AFC Wrap-Around Detection", which is now U.S. Patent Application Publication No. 2008/0013649. As a result of the logical OR, a receiver may switch into a high-speed mode of operation when at least one of these velocity estimates indicates high speed, and use a low-speed mode of operation only when all of these velocity estimates indicate low speed.

In FIG. 3, the Doppler-spread estimator 116 in the apparatus 300 may apply an argument- (or zero-) crossing algorithm or a level-crossing algorithm, for example, to received signals. At least the AFC 106 combines the estimates of the Doppler spread from the estimator 116 with a control signal, which the AFC 106 can either compute itself or receive from the device 302, in a logical OR fashion. The control signal indicates high velocity if the value of $\zeta(f_{err,f}^{res})$ exceeds a threshold, and low velocity otherwise. This will be seen to be the result of a method that includes steps 202-208 in FIG. 2. Based on the combination, the AFC can set its operating mode as either low-speed mode or a higher-speed mode. For just one of many possible examples, the control signal $f_{err}$ may be based on one channel estimate per finger in low-speed mode, and on five channel estimates per finger in high-speed mode.

As described above, an exemplary function $\zeta$ is the following:

$$\zeta(f_{err,f}^{res}) = \max_{f \in F}(f_{err,f}^{res})$$

and another exemplary function $\zeta$ is the following:

$$\zeta(f_{err,f}^{res}) = \frac{1}{F}\sum_{f \in F} f_{err,f}^{res}.$$

It will be understood that other functions $\zeta$ can be used for this improved velocity estimation. For example, one can use a weighted average, or use just a few of the fingers in F in averaging. One can also look at just one finger, e.g., $\zeta(f_{err,f}^{res}) = f_{err,1}^{res}$, which is currently believed likely to work well when the above-described adaptive AFC combining is used but not so well in other situations.

This improved velocity estimation has many applications in current communication system receivers. For just one example, the improved velocity estimation provides a more reliable speed-mode setting, reducing the risk of remaining in low-speed mode when the velocity is actually high, which can be detrimental to receiver performance.

Adaptive Residual Frequency Offset Compensation

As described above, the residual frequency offsets can be used for compensating received correlated signals. The inventor has recognized that it is desirable to perform such compensation only when it is necessary, e.g., when there is a large residual frequency offset. Hence, residual frequency offset compensation is advantageously selectively enabled only when $\zeta(f_{err,f}^{res})$ exceeds a selected threshold (which may be different from the threshold used for adaptive AFC combining and/or the threshold used for improved velocity estimation). Adaptive residual frequency offset compensation is thus switched off in situations where a large residual frequency offset is not experienced, which thereby reduces the computational effort of the receiver.

It is currently believed that a conventional Doppler estimate, such as would be provided by the Doppler estimator 116 depicted in FIG. 3, is probably not suitable by itself for determining when to perform the compensation because, as described above, standard Doppler estimators have problems detecting high-velocity LOS situations, where a large residual frequency offset may well occur if in soft handover.

Compensating for residual frequency offsets, which can enhance receiver performance in high-relative-velocity situations, comprises frequency-error correction, i.e., de-rotation, of de-spread symbols for each finger or transmitter. It will be understood that the transmitter may be a BS or cell in a cellular mobile telephone system, and that compensation per finger is equivalent to compensation per transmitter in many useful communication situations. It will also be understood that the transmitter may be a UE that a BS is receiving. Moreover, this invention can be used in peer-to-peer communication systems and in other systems, such as broadcasting systems (e.g., mobile television and the like).

Residual frequency offset compensation of received de-spread symbols $g_{i,f}$ such as symbols sent on a CPICH, is expressed by the following equations:

$$g_{i,f}^{CPICH,comp} = g_{i,f}^{CPICH}\exp(-j(2\pi\delta t i f_{err,f}^{res} + \theta_f)), i=1, 2, \ldots, N \quad (1)$$

in which $g_{i,f}^{CPICH,comp}$ are compensated, de-spread, CPICH symbols for finger f; $g_{i,f}^{CPICH}$ are de-spread CPICH symbols before compensation; $\delta t$ is the symbol time; i is a symbol index that identifies symbols within a given time interval, such as a time slot on the CPICH; N is the total number of symbols used within the given time interval; $f_{err,f}^{res}$ is the residual frequency offset for the finger f; and $$\theta_f = \arg(g_{N,f}^{CPICH,prev}) - \arg(p_N^{CPICH,prev}) \quad (2)$$

in which $g_{N,f}^{CPICH,prev}$ is the last de-spread symbol in the previous time interval before compensation and $p_N^{CPICH,prev}$ is the corresponding transmitted CPICH (pilot) symbol.

It will be noted that, for proper operation, a receiver that implements equations (1) and (2) also needs channel estimates derived from uncompensated symbols. Hence, when compensation for residual frequency offsets is applied, channel estimates must be produced both based on compensated and on uncompensated symbols. Alternatively, the compensation might be undone by re-rotating the channel estimates derived from compensated symbols in order to obtain channel estimates based on uncompensated symbols. Such "uncompensated" channel estimates would be used in an AFC in the receiver.

To reduce receiver complexity, power consumption, etc., compensation according to equations (1) and (2) may be switched on only when there is at least one large residual frequency offset $f_{err,f}^{res}$. Such selective enablement can be implemented by comparing $\max_f(f_{err,f}^{res})$ or another suitable function of $f_{err,f}^{res}$ to a threshold value, and generating compensated symbols when the threshold is crossed and not generating compensated symbols otherwise.

Figure 4:
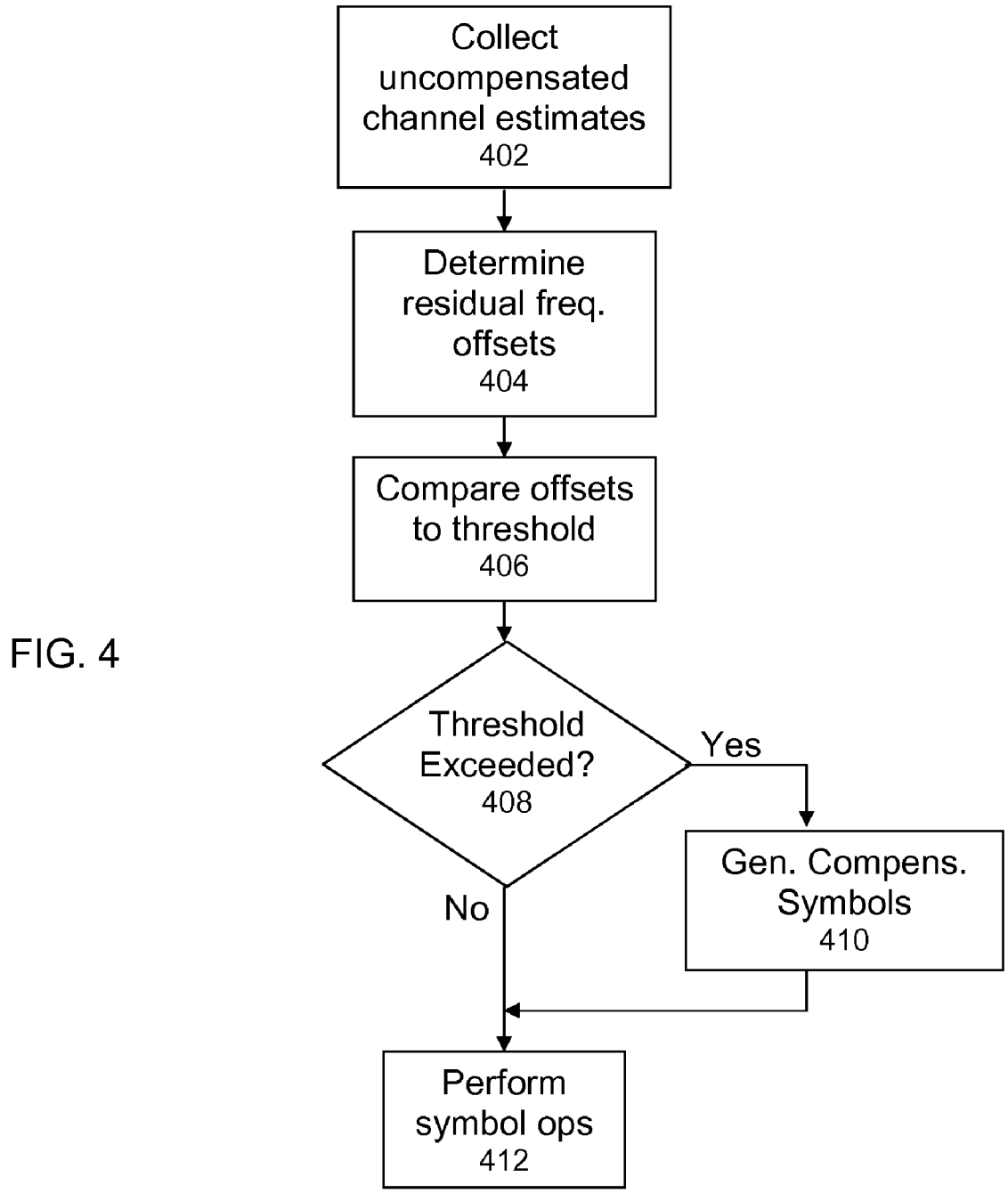
FIG. 4 is a flow chart of a method of adaptive residual frequency offset compensation.

FIG. 4 is a flow chart of a method of adaptive residual frequency offset compensation as described above. The method begins in general with a step of collecting a plurality of uncompensated channel estimates, each of which is based on a respective de-spread uncompensated correlated signal (step 402). The uncompensated channel estimates are used in the above-described AFC-like computations to determine respective residual frequency offsets for the correlated signals (step 404). The residual frequency offsets or a function of them are then compared to a threshold (step 406). If the threshold is exceeded (Yes in step 408), symbols compensated for the residual frequency offsets are generated (step 410). The compensated symbols can be used for symbol operations (step 412), such as channel estimation, SIR and power estimation, etc. If the threshold is not exceeded (No in step 408), the uncompensated symbols are used for the symbol operations (step 412). Suitable threshold values can be readily determined based on experiment and design preference and depend on, for example, the function $\zeta(f_{err,f}^{res})$ used.

Figure 5:
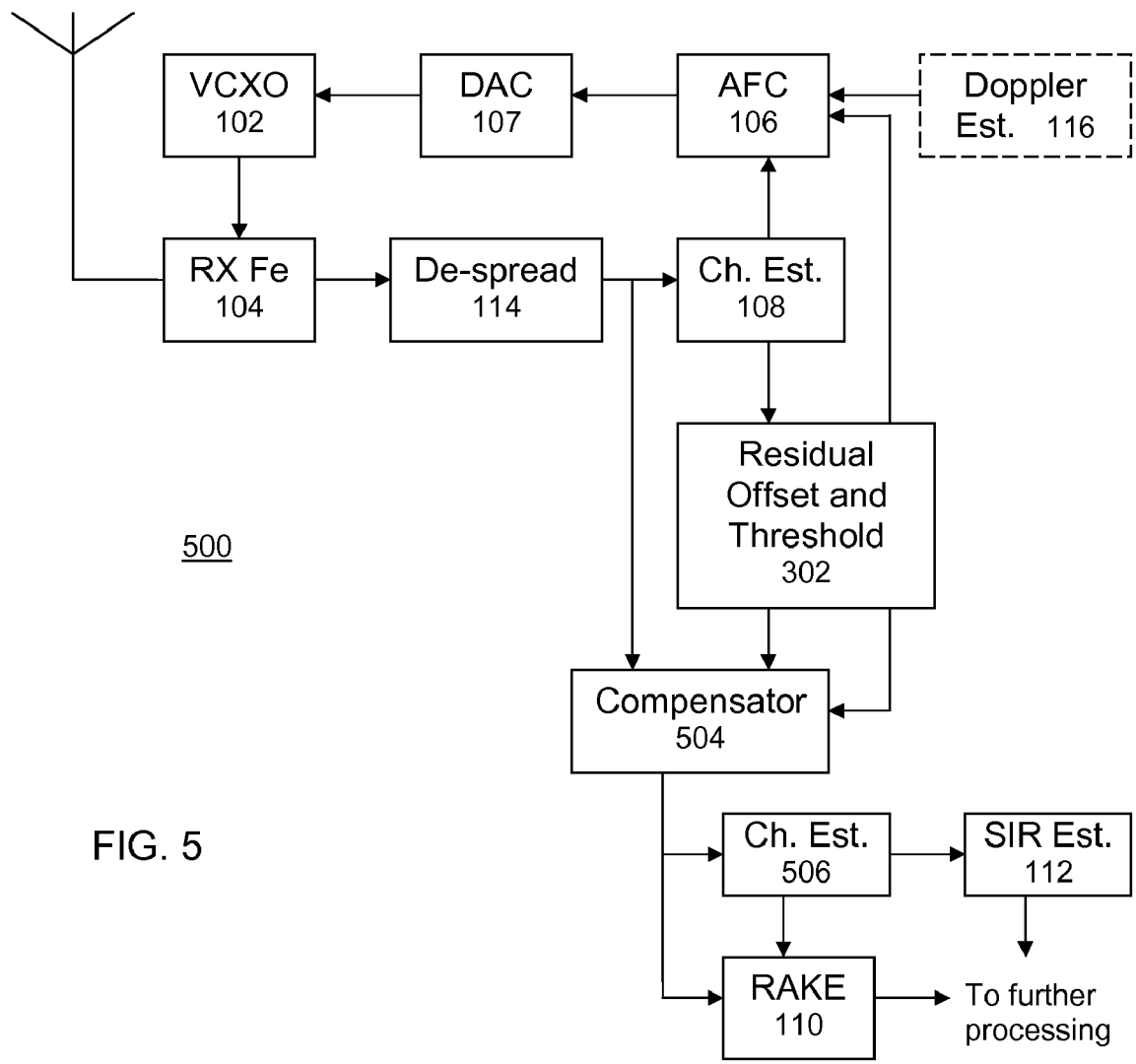
FIG. 5 is a block diagram of a portion of a receiver that generates de-spread symbols compensated for residual frequency offsets.

FIG. 5 is a block diagram of an apparatus 500, which may be a portion of a receiver in a typical UE or BS, that can carry out adaptive residual frequency offset compensation as described above. Those components of the apparatus 500 that are the same or substantially the same as the components of the apparatuses 100, 300 have the same reference numerals.

In FIG. 5, uncompensated channel estimates are provided by the channel estimator 108 to the residual frequency offset and threshold device 302, which computes the residual frequency offset per finger $f_{err,f}^{res}$ according to the AFC-like computations described above. It will be understood that the device 302 is shown in FIG. 5 as a separate block, but this is not necessary. The computations performed by the device 302 can be performed by any other suitable processor or logic device in the receiver, such as the AFC 106.

The respective residual frequency offsets for the fingers generated by the device 302 are provided to a compensator 504 together with the uncompensated de-spread correlated signals generated by the de-spreader 114. The compensator 504 generates compensated de-spread symbols (correlated signals) according to equations (1) and (2). As noted above, the operation of the compensator 504 can be selectively enabled/disabled based on the residual frequency offsets, i.e., by thresholding $\zeta(f_{err,f}^{res})$, and such thresholding can be carried out by a suitably programmed or configured device 302. If the compensator 504 is enabled in response to a control signal from the device 302, compensated de-spread symbols are provided to a channel estimator 506 and the RAKE combiner 110, which use the compensated de-spread symbols in the usual ways. In particular, channel estimates based on compensated de-spread symbols are provided to the RAKE combiner 110 and the SIR estimator 112. If the compensator 504 is not enabled, the uncompensated channel estimates generated by the estimator 108 may be fed through to the RAKE combiner 110, which also receives the de-spread signals generated by the de-spreader 114, and to the SIR estimator 112.

It will be understood that although FIG. 5 indicates two separate channel estimators 108, 506, this is not necessary. A single set of hardware or a single processor suitably configured or programmed can be used to perform the necessary operations.

In order to reduce receiver power consumption and complexity, an attractive alternative to the arrangement depicted in FIG. 5 may be to compensate only de-spread pilot symbols rather than de-spread pilot and other (e.g., traffic or data) symbols. In this way, fewer (symbol) compensations would be performed as the estimator 506 needs only the (compensated) pilot symbols to determine the (compensated) channel estimates. The compensated pilot symbols may then undergo an additional compensation, $\hat{h}_{i,f}^{RAKE} = \hat{h}_{i,f}^{comp} \exp(j(2\pi\delta t i f_{err,f}^{res} + \theta_f))$, when the channel estimates derived from the compensated pilot symbols are used, for example in RAKE combining. Such additional compensation may be carried out by the RAKE combiner 110 or another suitable device.

It will be appreciated that procedures described above are carried out repetitively as necessary, for example, to respond to the time-varying nature of communication channels between transmitters and receivers. In addition, in terms of the downlink and a UE, it will be understood that the methods and apparatus described here can be implemented in a BS or other uplink receiving node.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless receivers implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of controlling a receiver based on a signal received through a communication channel, comprising the steps of:
   collecting, by the receiver, a plurality of estimates of a channel parameter based on the signal received through the communication channel;
   determining a plurality of residual frequency offsets from the plurality of estimates of the channel parameter; and
   determining an operating mode of the receiver based on at least one of the plurality of residual frequency offsets, wherein determining the operating mode includes comparing a value of a function $\zeta$ of at least one of the plurality of residual frequency offsets with a threshold value; if the comparing indicates that the value of the function $\zeta$ crossed the threshold value, selecting a first group of estimates of the channel parameter for automatic frequency control (AFC) computations using the first group; and if the comparing indicates that the value of the function $\zeta$ did not cross the threshold value, selecting a second group of estimates of the channel parameter for AFC computations using the second group; and the first group is not the same as the second group.

2. The method of claim 1, wherein the channel parameter is an impulse response of the communication channel.

3. The method of claim 1, wherein the function $\zeta$ of at least one of the plurality of residual frequency offsets is one of $$\zeta(f_{err,f}^{res}) = \max_{f \in F}(f_{err,f}^{res})$$

and $$\zeta(f_{err,f}^{res}) = \frac{1}{F}\sum_{f \in F} f_{err,f}^{res},$$

in which $f_{err,f}^{res}$ denotes a respective residual frequency offset of a finger f, and F is a set of fingers.

4. The method of claim 1, further comprising the step of generating a velocity estimate, wherein the velocity estimate is based on the function $\zeta$ of the plurality of residual frequency offsets.

5. The method of claim 4, wherein the function $\zeta$ is one of $$\zeta(f_{err,f}^{res}) = \max_{f \in F}(f_{err,f}^{res})$$

and $$\zeta(f_{err,f}^{res}) = \frac{1}{F}\sum_{f \in F} f_{err,f}^{res},$$

in which $f_{err,f}^{res}$ denotes a respective residual frequency offset of a finger f, and F is a set of fingers.

6. The method of claim 1, wherein the step of determining the operating mode includes, if the comparing indicates that the value of the function $\zeta$ crossed the threshold value, generating symbols compensated for the residual frequency offsets.

7. The method of claim 6, wherein the function $\zeta$ is one of $$\zeta(f_{err,f}^{res}) = \max_{f \in F}(f_{err,f}^{res}) \text{ and } \zeta(f_{err,f}^{res}) = \frac{1}{F}\sum_{f \in F} f_{err,f}^{res},$$

in which $f_{err,f}^{res}$ denotes a respective residual frequency offset of a finger f, and F is a set of fingers.

8. The method of claim 7, wherein the symbols compensated for the residual frequency offsets are used for symbol operations.

9. The method of claim 8, wherein if the comparing indicates that the value of the function $\zeta$ did not cross the threshold value, uncompensated symbols are used for the symbol operations.

10. An apparatus for controlling a receiver based on a signal received through a communication channel, comprising:
    a de-spreader configured to generate correlated signals from the signal received through the communication channel;
    a channel parameter estimator configured to generate a plurality of channel estimates of a parameter of the communication channel from the correlated signals;
    a residual frequency offset computer configured to determine a plurality of residual frequency offsets based on the plurality of channel estimates; and
    a controller configured to determine an operating mode of the receiver based on at least one of the plurality of residual frequency offsets and to generate a control signal $f_{err}$ based on selected estimates of the parameter of the communication channel, wherein a mode of operation of the controller is determined based on at least one of the plurality of residual frequency offsets; a function $\zeta$ of the plurality of residual frequency offsets is compared to a threshold value; if the threshold value is exceeded the controller generates the control signal $f_{err}$ based on a first group of selected estimates of the parameter of the communication channel; and if the threshold value is not exceeded, the controller generates the control signal $f_{err}$ based on a second group of selected estimates of the parameter of the communication channel; and the first group is not the same as the second group.

11. The apparatus of claim 10, wherein the parameter of the communication channel is an impulse response of the communication channel.

12. The apparatus of claim 10, wherein the controller is configured to compare a value of the function $\zeta$ of at least one of the plurality of residual frequency offsets with the threshold value.

13. The apparatus of claim 12, further comprising a compensator configured to generate compensated de-spread symbols from the correlated signals and the residual frequency offsets, wherein the compensator is selectively enabled based on the residual frequency offsets.

14. The apparatus of claim 13, wherein the compensator is enabled if the comparing indicates that the value of the function $\zeta$ crossed the threshold value.

15. The apparatus of claim 14, wherein the function $\zeta$ is one of $$\varsigma(f_{err,f}^{res}) = \max_{f \in F}(f_{err,f}^{res}) \text{ and } \varsigma(f_{err,f}^{res}) = \frac{1}{F}\sum_{f \in F} f_{err,f}^{res},$$

in which $f_{err,f}^{res}$ denotes a respective residual frequency offset of a finger f of the de-spreader, and F is a set of fingers.

16. The apparatus of claim 15, wherein the symbols compensated for the residual frequency offsets are used for symbol operations.

17. The apparatus of claim 16, wherein if the comparing indicates that the value of the function $\zeta$ did not cross the threshold value, uncompensated symbols are used for the symbol operations.

18. The apparatus of claim 10, wherein the function $\zeta$ of the plurality of residual frequency offsets is one of $$\varsigma(f_{err,f}^{res}) = \max_{f \in F}(f_{err,f}^{res}) \text{ and } \varsigma(f_{err,f}^{res}) = \frac{1}{F}\sum_{f \in F} f_{err,f}^{res},$$

in which $f_{err,f}^{res}$ denotes a respective residual frequency offset of a finger f of the de-spreader, and F is a set of fingers.

19. The apparatus of claim 10, wherein the residual frequency offset computer is configured to generate a velocity estimate that is based on the function $\zeta$ of the plurality of residual frequency offsets.

20. The apparatus of claim 19, wherein the function $\zeta$ is one of $$\varsigma(f_{err,f}^{res}) = \max_{f \in F}(f_{err,f}^{res}) \text{ and } \varsigma(f_{err,f}^{res}) = \frac{1}{F}\sum_{f \in F} f_{err,f}^{res},$$

in which $f_{err,f}^{res}$ denotes a respective residual frequency offset of a finger f of the de-spreader, and F is a set of fingers.

* * * * *